(12) United States Patent
Barlian et al.

(10) Patent No.: US 6,980,708 B2
(45) Date of Patent: Dec. 27, 2005

(54) DEVICE FOR FIBRE OPTIC TEMPERATURE MEASUREMENT WITH AN OPTICAL FIBRE

(75) Inventors: Reinhold A. Barlian, Bad Mergentheim (DE); Alfred Boehm, Viechtach (DE)

(73) Assignee: Bartec GmbH, Bad Mergentheim (DE)

( * ) Notice: Subject to any disclaimer, the term of this patent is extended or adjusted under 35 U.S.C. 154(b) by 241 days.

(21) Appl. No.: 10/436,501

(22) Filed: May 13, 2003

(65) Prior Publication Data

US 2004/0007668 A1 Jan. 15, 2004

(30) Foreign Application Priority Data

May 13, 2002 (DE) .......................... 202 07 493 U
Apr. 17, 2003 (EP) ............................... 03008744

(51) Int. Cl.[7] .............................................. G02B 6/00
(52) U.S. Cl. .................... 385/12; 385/100; 385/101
(58) Field of Search ................................ 385/88–94

(56) References Cited

U.S. PATENT DOCUMENTS

| 4,119,363 A | * | 10/1978 | Camlibel et al. ............. 385/94 |
|---|---|---|---|
| 4,436,363 A | * | 3/1984 | Steinbruegge et al. ...... 359/359 |
| 4,865,418 A | * | 9/1989 | Takahashi et al. ........... 385/142 |
| 5,167,235 A | * | 12/1992 | Seacord et al. ............. 600/474 |

FOREIGN PATENT DOCUMENTS

| EP | 0 898 158 A2 | 7/1998 | ............. G01J 5/00 |
|---|---|---|---|
| EP | 1 180 669 A1 | 8/2000 | ............. G01J 5/10 |
| EP | 1 199 583 A2 | 4/2002 | ............. G02B 6/34 |
| JP | 60-151524 | 8/1985 | ............. G01J 5/08 |
| JP | 61-061023 | 3/1986 | ............. G01J 5/10 |
| JP | 61-061524 | 3/1986 | ............. G01J 5/10 |
| JP | 61061023 | * 3/1986 | ............. G01J 5/10 |
| JP | 63-121721 | 5/1988 | ............. G01J 5/08 |
| JP | 04-221723 | 8/1992 | ............. G01J 1/42 |

* cited by examiner

*Primary Examiner*—Frank G. Font
*Assistant Examiner*—Derek L. Dupuis
(74) *Attorney, Agent, or Firm*—Jacobson Holman PLLC

(57) ABSTRACT

The invention relates to a device for fiber optic temperature measurement with an optical fiber having a radiation coupling in area and a detector-associated radiation coupling out area. Such a device is characterized in that the optical fiber is constructed with high transmission in the infrared (IR) spectral range, particularly in the range from approximately 2 μm to approximately 20 μm.

43 Claims, 8 Drawing Sheets

DEVICE FOR FIBRE OPTIC TEMPERATURE MEASUREMENT WITH AN OPTICAL FIBRE

BACKGROUND OF THE INVENTION

The invention relates to a device for fibre optic temperature measurement with an optical fibre, which has a radiation coupling in area and a detector-associated radiation coupling out area.

A device of this kind is known from EP 0 898 158 A2, which describes a high temperature pyrometer, which is in particular suitable for measuring temperatures in a gas turbine. In the case of this pyrometer infrared (IR) radiation is coupled into an optical fibre in a high temperature area of the measuring arrangement. The optical fibre leads to a detector, which is located in an area where moderate temperatures prevail.

According to EP 0 898 158 A2, the optical fibre is made from fused quartz or sapphire crystal. Such optical fibres are heat resistant up to temperatures of approximately 1100° C. or 1900° C., respectively, and are therefore suitable for use in the high temperature range. In addition, such optical fibres are transparent in a spectral range of a heat source with temperatures in the high temperature range and therefore suitable for high temperature measurements.

However, such optical fibres have a very high absorption for an IR radiation with a wavelength higher than typically 4 $\mu$m. Therefore these optical fibres are unsuitable for transmitting IR radiation in a spectral range of a heat source with temperatures in the low temperature range, i.e. typically −100° C. to +400° C. Thus, pyrometers according to EP 0 898 158 A2 are unsuitable for temperature determination in the low temperature range.

EP 1 180 669 A1 discloses a device used for temperature determination in the low temperature range. This device is a measuring arrangement for pyrometric temperature determination of a cooking vessel. A detector is also provided, which is placed in a cooler area removed from a heat source. For transmitting thermal radiation to the detector tubular IR lines are provided, whose inner faces are IR-reflecting, e.g. gold-coated.

Such tubular IR lines suffer from the disadvantage that they are not very flexible, so that the measuring arrangement is only suitable for a limited number of measuring tasks. In addition, the IR-reflecting inner faces are subject to ageing, which leads to a change to the reflection factor of the walls and therefore the transmission of the IR line. In turn this leads to a falsification of the measured value. It is also disadvantageous that the radiation losses in such IR lines are relatively high, which makes difficult measurements over longer distances.

The object of the invention is to provide a device for fibre optic temperature measurement with high measurement precision, which is suitable for the low temperature range, particularly approximately −100° C. to +400° C. and in which the actual detector can be positioned in a cool area remote from the measurement point.

DESCRIPTION OF THE INVENTION

This object is achieved by a device for fibre optic temperature measurement with an optical fibre, which has a radiation coupling in area and a radiation coupling out area associated with a detector, wherein said optical fibre is constructed with high transmission in the infrared (IR) spectral range. Preferred embodiments of the invention are given in the dependent claims.

A fundamental idea of the invention is to use an optical wave-guide, which in the spectral range of a heat source with temperatures in the low temperature range has a high transmission. In this way it is possible to transmit the IR radiation of a body having temperatures of −100° C. to +400° C. to a detector remote from the actual measurement point and therefore use the same for a relatively precise temperature measurement.

Another important idea of the invention is to provide a compensating device for taking account of a thermal characteristic radiation of the optical fibre during temperature measurement. The thermal characteristic radiation of the optical fibre is dependent on its intrinsic temperature. In addition to the IR radiation of the body to be measured, the characteristic radiation of the optical fibre located in the IR spectral range is conducted therefrom to the detector where it is detected. As a result of the thermal characteristic radiation there is frequently an intensity and power increase of the IR radiation transmitted by the optical fibre. A measuring signal of the detector is consequently not only dependent on the intensity of the infrared radiation entering the optical fibre at the measurement point, but also the temperature or heat distribution along the optical fibre. A compensating device according to the invention, which is independent of the spectral range and high transmission, now makes it possible to remove the influences of the thermal characteristic radiation of the optical fibre from the detector measuring signal and consequently permits a particularly precise temperature measurement. Fundamentally there is no need to know the temperature distribution along the optical fibre.

The compensating device advantageously has means for producing a compensating signal and means for correcting the measuring signal of the detector with the compensating signal. The correcting means can have means for offsetting against the measuring signal the compensating signal and in particular means for working out a difference from said signals. Such an arrangement makes it possible to provide a measuring signal from which the fibre characteristic radiation has been removed. The measuring signal and compensating signal are preferably signal voltages.

The compensating device is appropriately designed in such a way that it takes account of the damping of the thermal characteristic radiation of the optical fibre in the same, as a result of which characteristic radiation arising close to the detector has stronger effects on the measuring signal than characteristic radiation arising further away from the detector.

Fundamentally in a device according to the invention, the optical fibre can be constructed with high transmission in the IR spectral range, particularly in the range approximately 2 $\mu$m to approximately 20 $\mu$m. It is particularly appropriate if the optical fibre is constructed with high transmission in the wavelength range 4 $\mu$m to 18 $\mu$m, which is particularly suitable for temperature measurements in the low temperature range.

In general, it is possible to use any optical fibre having a high transmission in the wavelength range approximately 2 $\mu$m to approximately 20 $\mu$m or 4 $\mu$m to 18 $\mu$m. Such fibres can e.g. also be used as optical guides for $CO_2$ or CO lasers. It is particularly preferable for the optical fibre to be a silver halide fibre, particularly a fibre based on a solid AgCl:AgBr solution. Such optical waveguides are particularly suitable for transmitting radiation in the medium IR range. They can e.g. have a polycrystalline structure and the particle size can vary. They can e.g. be purely core fibres or can have a cladding.

According to the invention any detector suitable for the IR spectral range can be used, e.g. a photoresistor, a thermocouple, a bolometer or a semiconductor detector such as e.g. a photodiode. Preferably a thermopile is used as the detector. This makes it possible to perform particularly precise temperature measurements whilst still having an economic construction.

Advantageously the detector has a hermetically sealed casing. It is also appropriate for the hermetically sealed casing to have a passage for the optical fibre and for a coupling out point of the optical fibre to be located within the casing. This arrangement minimizes the influence of extraneous radiation on the detector. This also counteracts ageing or damage to the optical fibre in the coupling out area as a result of the incidence of light, particularly visible stray light. The particularly preferred passage of the optical fibre through the casing also ensures that losses of radiation power during coupling out in the detector are of a minimum level and in particular no reflection losses occur at a detector casing window.

Appropriately the hermetically sealed casing is filled with an inert gas, which can e.g. be nitrogen or argon. Alternatively the hermetically sealed casing can be evacuated. As a result of these alternative embodiments it is ensured that no harmful gases reach the fibre and consequently no fibre damage occurs. Moreover, through the preferred filling of the casing with a suitable gas or by the evacuation of the detector casing, more particularly the thermodynamic behaviour is improved and absorption losses of the IR radiation intensity in the area between a coupling out point of the optical fibre and the detector are minimized.

According to a further preferred embodiment of the invention, in the passage for the optical fibre on the detector casing is provided a first ferrule in which is held the optical fibre. This permits a particularly simple and therefore economic adjustment of the optical fibre.

According to another advantageous embodiment the distance between the optical fibre coupling out point and a sensitive coating of the detector is set in such a way that the radiation cone leaving the optical fibre very precisely covers the surface of the sensitive coating of the detector, i.e. IR light rays leaving the optical fibre under an angle smaller than the angular aperture strike the sensitive coating. This improves the sensitivity and signal-to-noise ratio of the measuring device.

According to a further improvement, outside the detector casing, the optical fibre is surrounded by a protective device, particularly a protective tube. This prevents damage to the optical fibre by ambient light or by atmospheric gases. In accordance with the desired use of the device the protective device can be made e.g. flexible and/or heat-resistant. The protective device can e.g. be filled with an inert gas or evacuated.

Appropriately the optical fibre is held in a second ferrule, which is fitted into the protective tube, in the IR coupling in area. This permits a particularly simple and at the same time hermetically sealed fixing of a fibre end to the protective tube in the coupling in area.

Preferably the first ferrule provided in the casing passage is fitted into the protective tube. This permits a particularly simple and at the same time hermetically sealed detector-side termination of the protective tube.

It is particularly appropriate for the optical fibre to have an optical filter in the coupling in area. This enables radiation harmful to the optical fibre to be filtered out and also permits a hermetically sealed termination of the optical fibre in the coupling in area and consequently provides protection against harmful gases or substances.

The optical filter is advantageously designed as a band pass filter. Preferably the transmission range of the optical fibre is in an "atmospheric window", i.e. in a wavelength range where there is only a weak atmospheric gas absorption. This ensures that there is no falsification of the measured results by foreign gases or water vapour, or the influence thereof remains limited. It is in particular provided that the optical filter has a transmission range in an "atmospheric window" of 8 $\mu$m to 14 $\mu$m. According to another preferred embodiment of the invention the optical filter is provided with an antireflection coating, so that reflection losses in the coupling in area of the optical fibre can be reduced.

Preferably the optical filter is constructed as an optical element, particularly as a lens. This makes it possible to improve the coupling in of radiation into the optical fibre, with at the same time a simple design. As the minimum diameter of the optical fibre is essentially determined by the optical fibre diameter, the filter can remain small and therefore inexpensive.

According to another advantageous embodiment an optical system is placed in the coupling in area upstream of the optical fibre. This optical system permits a particularly effective coupling of the IR radiation into the optical fibre. Preferably the optical system is constructed as a polished cone or a paraboloid. This design is very simple and therefore inexpensively manufacturable and at the same time permits an effective coupling in of radiation. However, other optical systems, such as e.g. lens systems can also be used.

Appropriately the optical system has a disk which is transparent in the infrared range, which protects the system and/or optical fibre against harmful environmental influences. The disk is preferably made from germanium, silicon, sapphire or a compound of one or more of these materials and can e.g. be a silicon monocrystal. Other materials or their compounds transparent in the infrared range can also be used.

A fundamental idea of the invention is characterized in that the compensating device has a compensating fibre associated with a compensating detector and which is arranged in close spatial and thermal contact with the optical fibre. In such an arrangement the characteristic radiation of the optical fibre can be taken into account in a particularly simple way. The compensating fibre is preferably located in the immediate vicinity of the optical fibre and in particular parallel thereto. As a result the temperature distribution along the compensating fibre very accurately corresponds to the temperature distribution along the optical fibre, so that a particularly accurate compensating signal can be obtained. The compensating signal can be produced by the compensating detector. The compensating fibre is appropriately located directly on the optical fibre. The compensating fibre can be an optical waveguide conducting in the IR range and preferably the compensating fibre and optical fibre have the same design and/or material characteristics. As a result a particularly easily interpretable compensating signal can be obtained.

Advantageously the compensating fibre is silvered and/or closed at an end remote from the compensating detector. However, the optical fibre can be directed towards the object to be measured. As a result of such an arrangement it is reliably ensured that in the compensating fibre only the intrinsic temperature of said compensating fibre produces radiation, but not the object to be measured. This makes it possible to obtain a particularly precise compensating signal.

In a particularly preferred embodiment of the invention the compensating detector and detector have the same construction. In particular, a compensating detector casing can have the same design and filling as the detector casing. Preferably a passage of the compensating fibre through the compensating detector casing and an arrangement of the compensating fibre relative to the compensating detector can have the same construction as the passage of the optical fibre through the detector casing or the arrangement of the optical fibre relative to the detector. Preferably both the detector and the compensating detector are thermopiles. Such an arrangement makes it possible to produce a compensating signal, which reflects particularly well the temperature distribution along the optical fibre. The temperature of the object to be measured can be determined particularly easily by working out a difference between the measuring signals of both thermopiles.

A device for fibre optical temperature measurement with a particularly simple construction can be obtained in that the detector and compensating detector are placed and in particular applied to a common support. In such a dual sensor arrangement both the detector and the compensating detector and therefore both the measuring signal and the compensating signal are subject to the same thermal conditions. This permits a particularly reliable compensation of the thermal characteristic radiation of the optical fibre. Preferably means are provided for the optical separation or shielding of the two detectors with respect to one another, so that stray radiation can be reduced.

An alternatively constructed compensating device is characterized in that it has a temperature-dependent conductor. Such a temperature-dependent conductor makes it possible to detect the temperature distribution along the optical fibre and therefore to produce the compensating signal in a particularly simple manner. A temperature-dependent conductor has a temperature-dependent resistance, which can be particularly easily detected and evaluated electronically and processed to the compensating signal.

Preferably the temperature-dependent conductor is in the form of a wire. Such a wire can be particularly easily fitted in the immediate vicinity of the optical fibre and therefore particularly precisely determines the temperature distribution along the optical fibre. Advantageously the wire is thin and in particular has a diameter smaller than that of the optical fibre. As a result the flexibility of the optical fibre is not even influenced by the wire if the latter is positioned directly along said optical fibre. When using a thin wire there are also relatively high, electronically readily evaluatable resistance changes.

In an advantageous further development of the invention the wire is a nickel wire, which has a high thermal stability. When using nickel, there are also relatively high, readily evaluatable resistance changes as a result of its high resistance factor. In addition, nickel wires are comparatively inexpensive. Alternatively gold, silver, platinum or other metal wires can be used, which also have a high resistance factor and/or a good thermal stability. It is also possible to use alloys containing the aforementioned metals.

It is fundamentally possible for the wire to run along and parallel to the optical fibre. However, it is particularly preferable for the wire to be placed round the optical fibre, accompanied by the formation of windings. As a result of such a winding the optical fibre temperature is detected in an optimum manner and the wire length is increased, which has a positive effect on the resistance value and therefore the attainable desired signal. Through increasing the wire length more particularly the resistance is increased.

It is also advantageous to wind the resistance wire in bifilar manner. An outward line and a return line can be parallel to one another, which further increases the wire length. To avoid short-circuits, preferably the wire is insulated.

It is fundamentally possible for the wire windings to be arranged with a constant pitch along the optical fibre. The term pitch is understood to mean the spacing between two adjacent windings in the longitudinal direction of the optical fibre. However, it is particularly preferable for the wire winding to have different pitches adapted to the damping behaviour of the optical fibre. The radiation intensity in the optical fibre can have a non-linear, particularly logarithmic or exponential damping behaviour. Thus, the radiation arising at the optical fibre side remote from the detector can be damped overproportionally compared with the radiation arising in the vicinity of the detector. However, the temperature-dependent conductor can have a linear damping pattern. A particularly precise compensating signal can now be obtained in that the pitch of the wire windings is varied along the optical fibre corresponding to its damping behaviour. In particular, the winding can run correspondingly and in particular proportionally to the fibre damping.

It is fundamentally possible to wind the wire directly round the optical fibre. However, preferably the optical fibre is surrounded by a sleeve, which can have grooves for receiving the temperature-dependent conductor. As a result of such grooves the positioning of the wire during the manufacture of the device is significantly facilitated and makes it more difficult for the wire to move during the operation of the device. The sleeve advantageously has a good thermal conductivity, so that there is a good thermal contact between the optical fibre and the wire. In order to avoid short-circuits in the wire, the sleeve is preferably electrically insulating and is preferably also flexible.

The protective device or tube surrounding the optical fibre outside the detector casing preferably has a good thermal insulation. As a result the optical fibre temperature can be kept very constant, which further minimizes impairment of the measuring signal by the thermal characteristic radiation of the fibre.

For a particularly good compensation of the thermal characteristic radiation of the optical fibre, it is also possible for the compensating device to have both a temperature-dependent conductor and a compensating fibre.

DESCRIPTION OF THE DRAWINGS

The invention is described in greater detail hereinafter relative to preferred embodiments and the attached drawings, wherein show.

DETAILED DESCRIPTION OF PREFERRED EMBODIMENTS

Figure 1:
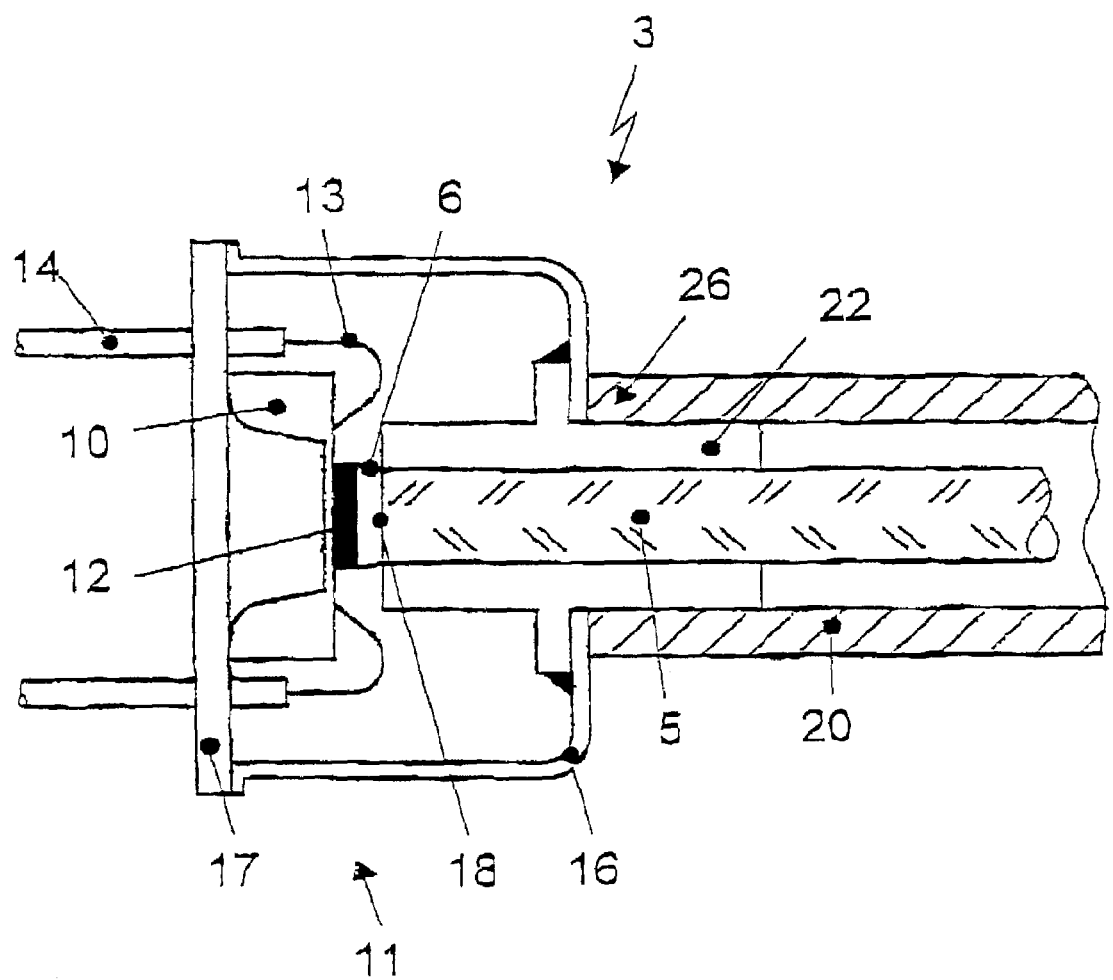
FIG. 1 A diagrammatic axial section through a device for fibre optic temperature measurement in a coupling out area associated with a detector.

An infrared (IR) coupling out area 3 of a device for fibre optic temperature measurement is shown in FIG. 1. An optical fibre 5 is spaced from a detector 10. Connecting wires 13 and connecting pins 14 permit an electronic connection of the detector 10 to a not shown evaluation electronics. The detector 10 is encapsulated in hermetically sealed manner with respect to a detector base 17 or a terminating plate by means of a detector cover 16. The detector base 17 and detector cover 16 form a detector casing 11.

At a coupling out point 18 an IR radiation cone 6 passes out of the optical fibre 5 and strikes a sensitive coating 12 of the detector 10. At the top side the detector casing 11 has a passage 26 for the optical fibre 5 and which receives a first ferrule 22, in which is in turn held the optical fibre 5. Outside the detector casing 11 the optical fibre 5 is surrounded with radial spacing by a protective tube 20, which is sealed with respect to the ferrule 22 and/or the casing 11.

Figure 2:
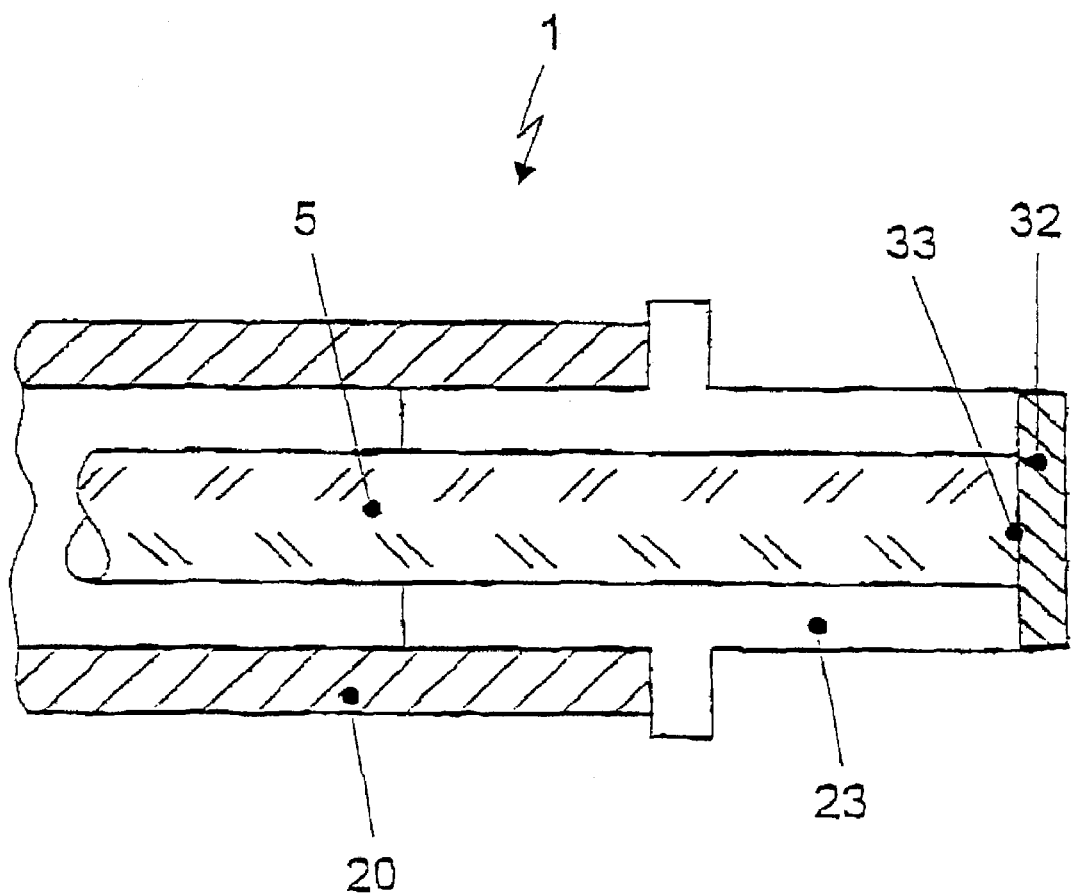
FIG. 2 A diagrammatic axial section through a device for fibre optic temperature measurement in a coupling in area.

FIG. 2 shows an IR coupling in area 1 of a device for fibre optic temperature measurement. An optical fibre 5 is held in a second ferrule 23, which is in turn fitted into the protective tube 20. The optical fibre 5 is hermetically sealed by an optical filter 32 at its coupling in face 33. The ferrule 23 or 22 is in the form of a plug-in sleeve for accurately fitting reception and inside passage of the optical fibre and there is an external, radial fitting or mounting flange with respect to the protective tube 20 or the interior of the casing 11.

Figure 3:
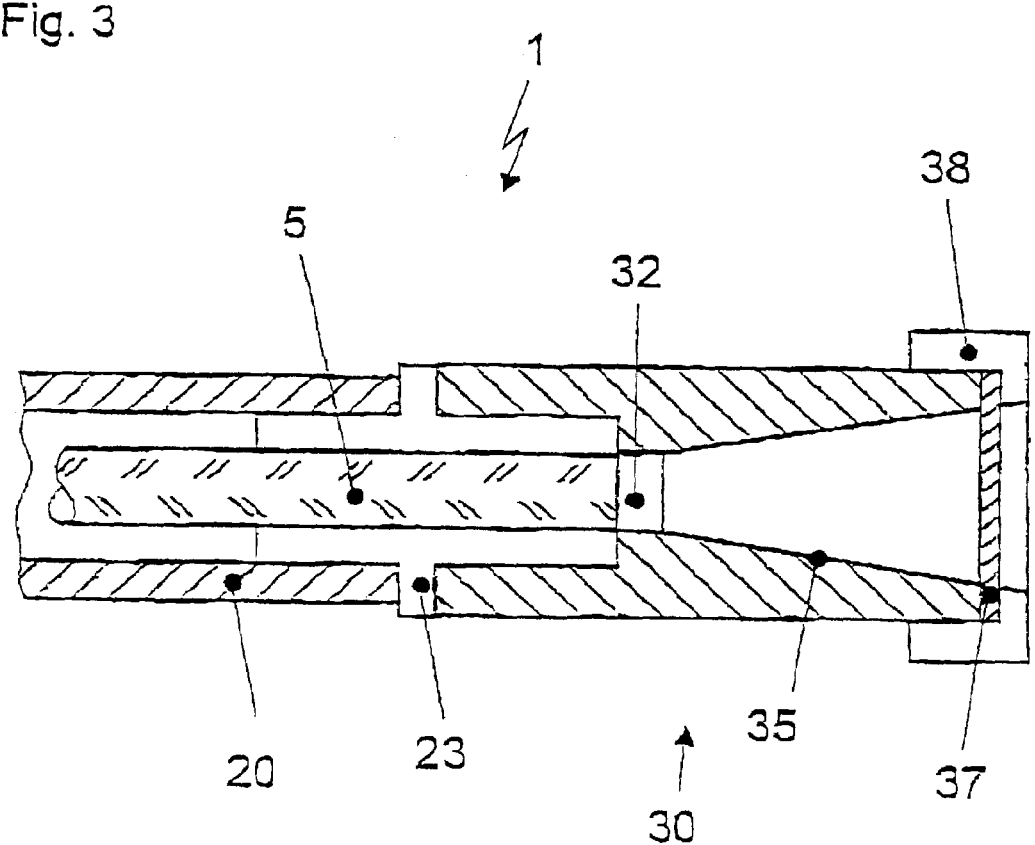
FIG. 3 A diagrammatic axial section through a device for fibre optic temperature measurement in a coupling in area having an optical system.

FIG. 3 shows a coupling in area 1 in which an optical system 30 is positioned upstream of the optical fibre 5 and optical filter 32. The optical system 30 is constructed as a polished cone 35 tapering towards the optical fibre 5 and which is covered by an infrared-transparent disk 37. The disk is held on the optical system 30 by a holder 38. The optical system 30 is connected to the second ferrule 23.

Figure 4:
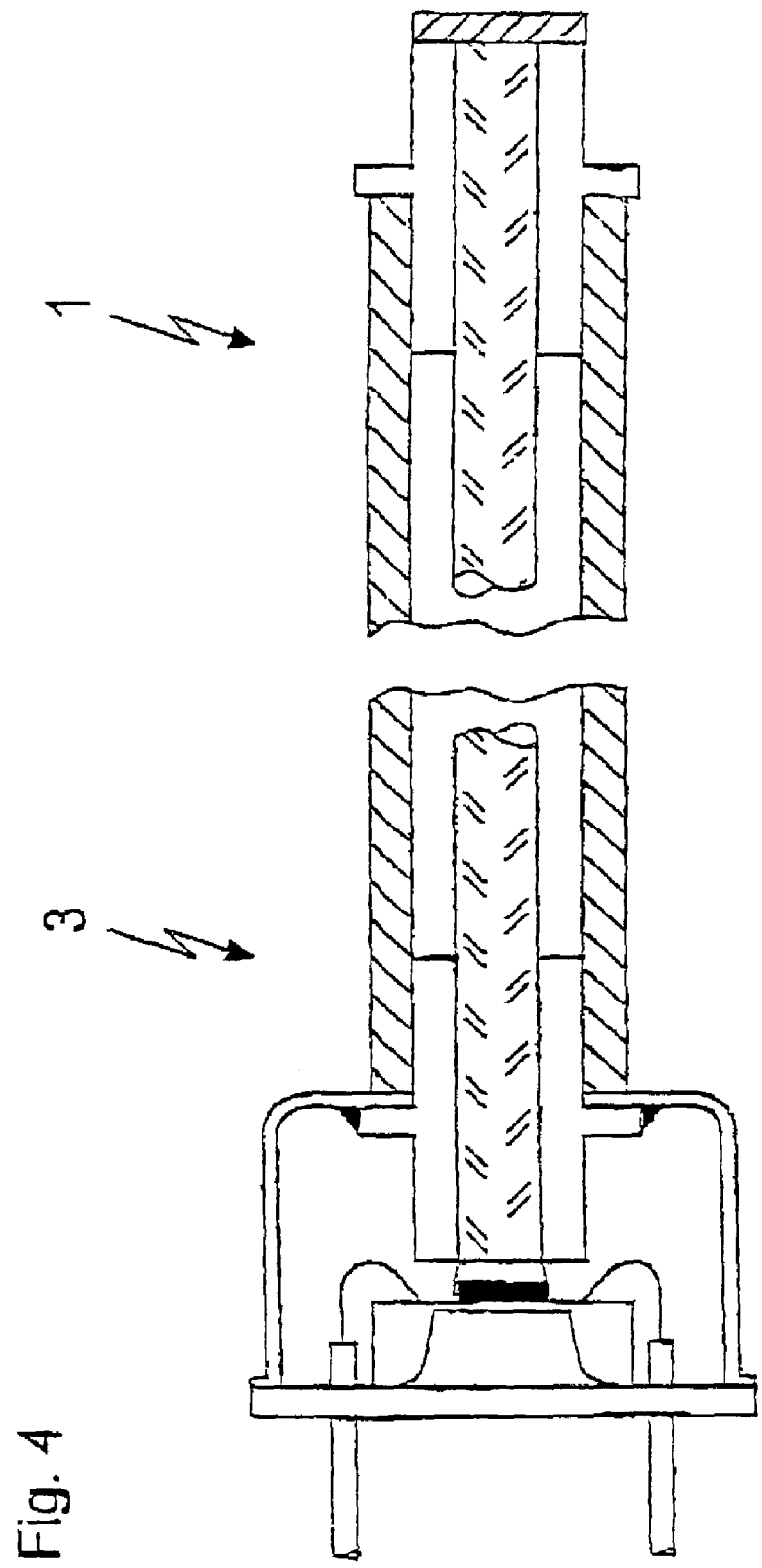
FIG. 4 A diagrammatic axial section through an overall device with a coupling in area and a coupling out area according to FIGS. 1 and 2.

FIG. 4 diagrammatically shows both the coupling in area 1 according to FIG. 2 and the coupling out area 3 according to FIG. 1 of a fibre optic temperature measurement device.

Figure 5:
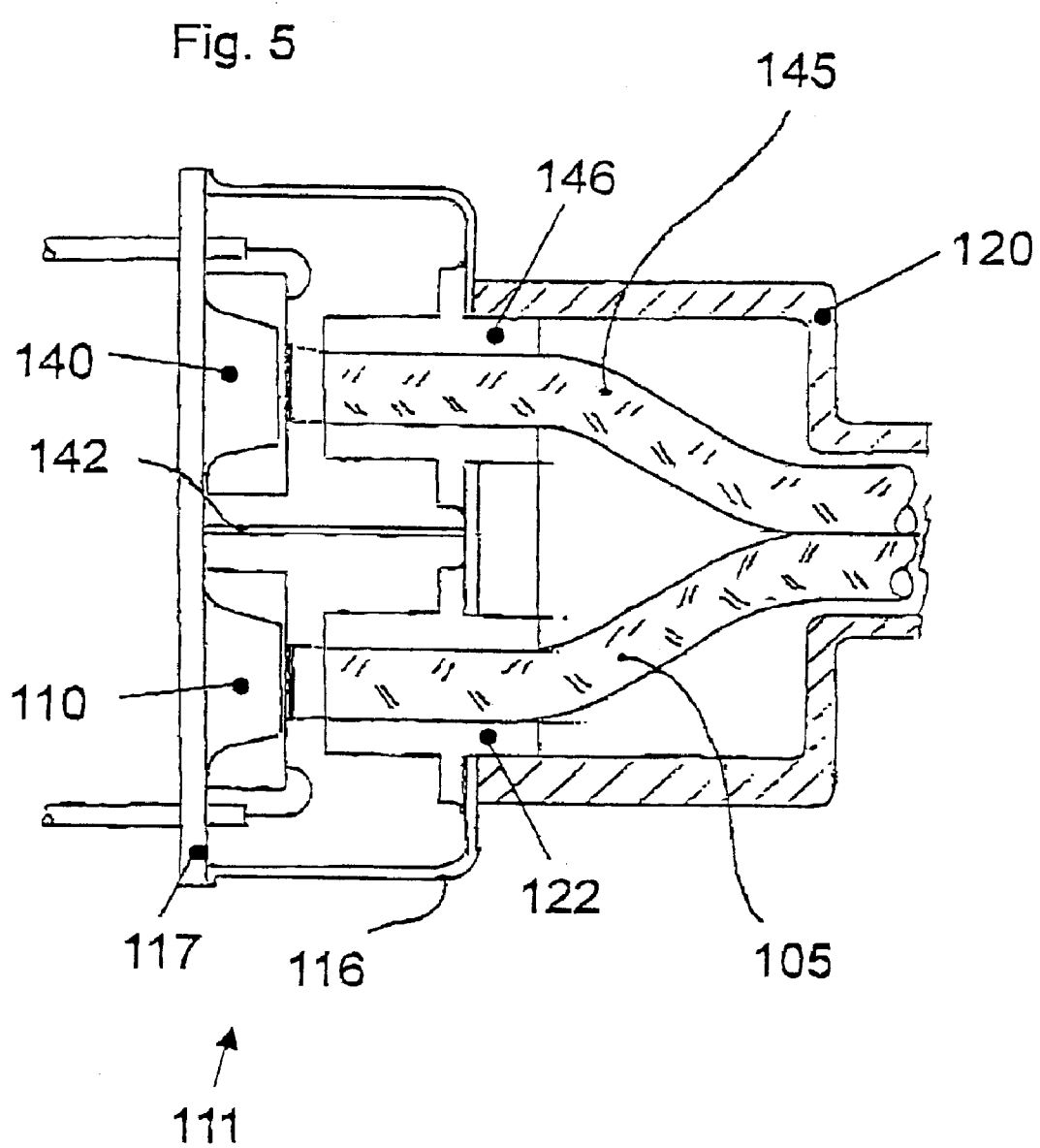
FIG. 5 A diagrammatic axial section through a fibre optic temperature measurement device having a compensating fibre in a coupling out area.
Figure 6:
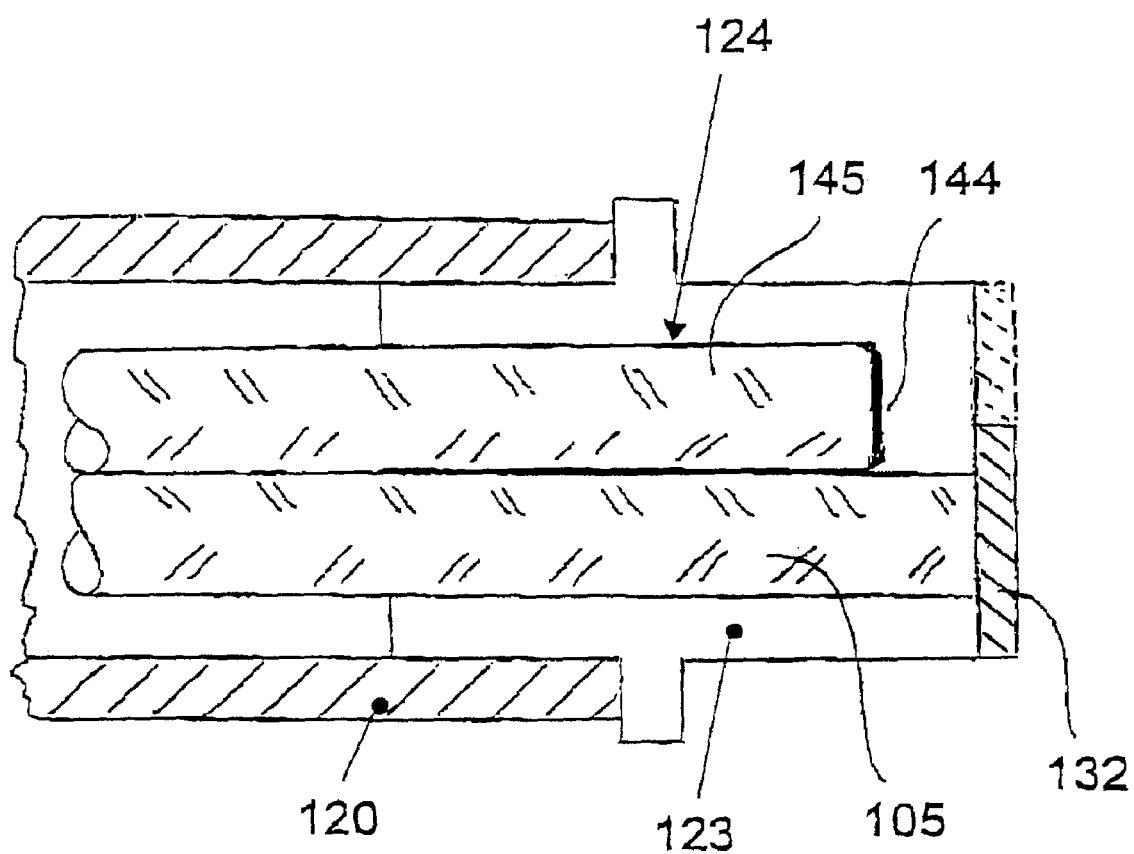
FIG. 6 A diagrammatic axial section through a fibre optic temperature measurement device having a compensating fibre in a coupling in area.

FIGS. 5 and 6 show a further embodiment of a fibre optic temperature measurement device having a compensating device with a compensating fibre 145. An optical fibre 105 and the compensating fibre 145 run parallel and in immediately juxtaposed manner in the interior of the protective tube 120. The optical fibre 105 pictures on a detector 110 and the compensating fibre 145 on a compensating detector 140. Detector 110 and compensating detector 140 are both constructed as thermopiles and located in a common detector casing 111. Detector 110 and compensating detector 140 are both fitted to a common support constructed as a common detector base 117. The common detector casing 111 has a common detector cover 116, which contains both the detector 110 and the compensating detector 140. In the common detector casing 111 between detector 110 and compensating detector 140 is provided an optical separating disk 142 for the optical separation or shielding of the two detectors 110, 140.

In the immediate vicinity of the common detector casing 111 there is a branching off of the optical fibre 105 and compensating fibre 145 and, separately from one another, they pass through a first ferrule 122 enclosed in the common detector cover 116 or a compensating fibre ferrule 146 enclosed in the common detector cover 116, respectively, into the common detector casing 111. The protective tube 120 widens corresponding to the branching of the optical fibre 105 from the compensating fibre 145. The protective tube 120 is connected flush to the ferrules 122, 146 and the common detector cover 116.

On the side (FIG. 6) remote from the common detector casing 111 the protective tube 120 is terminated by a second ferrule 123. The second ferrule 123 has a blind hole 124 into which is introduced the compensating fibre 145, which terminates there. At the end located in the blind hole 124 the compensating fibre 145 has a silvering 144.

The optical fibre 105 parallel to the compensating fibre 145 passes through the second ferrule 123 and is terminated by a window constructed as an optical filter 132, which is fixed with a smaller diameter to the second ferrule 123.

Figure 7:
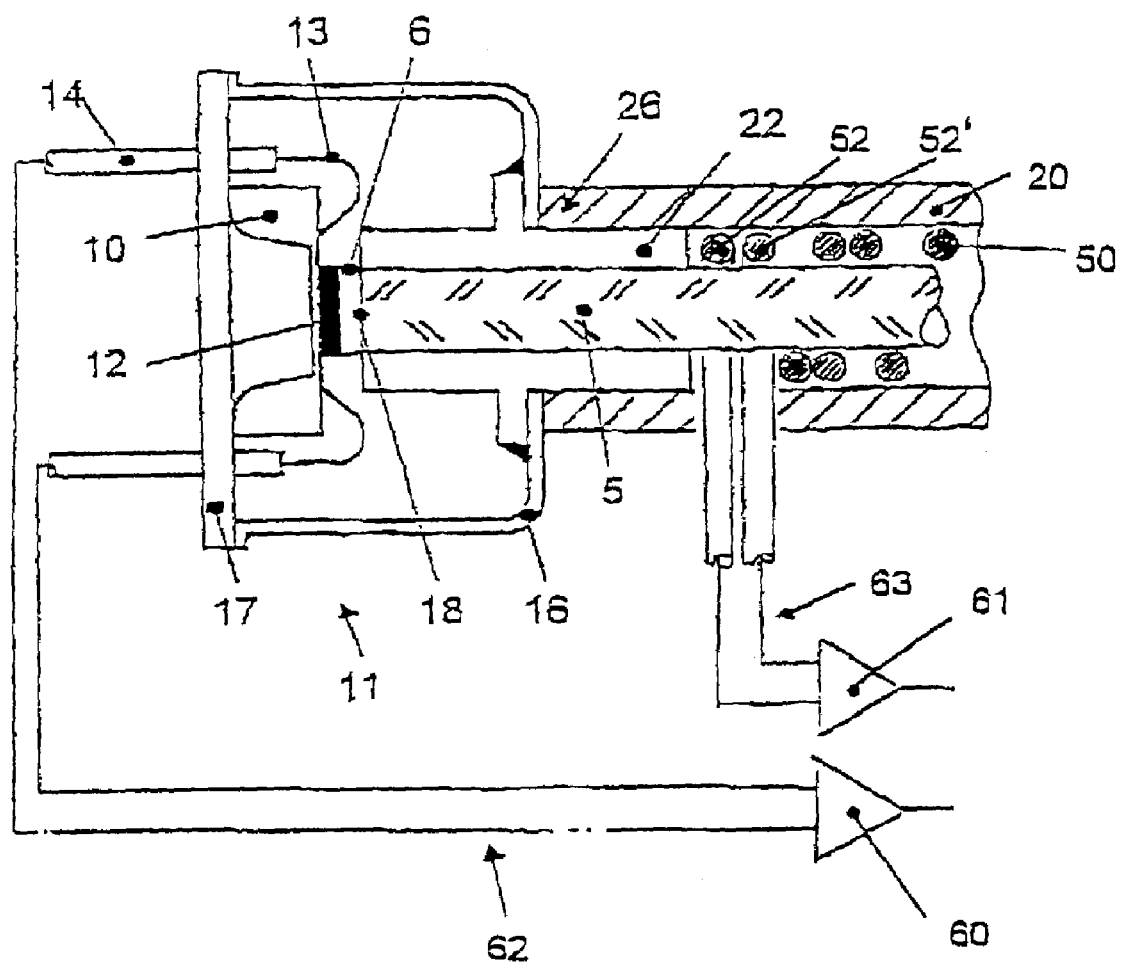
FIG. 7 A diagrammatic axial section through a fibre optic temperature measurement device having a temperature-dependent conductor in a coupling out area.
Figure 8:
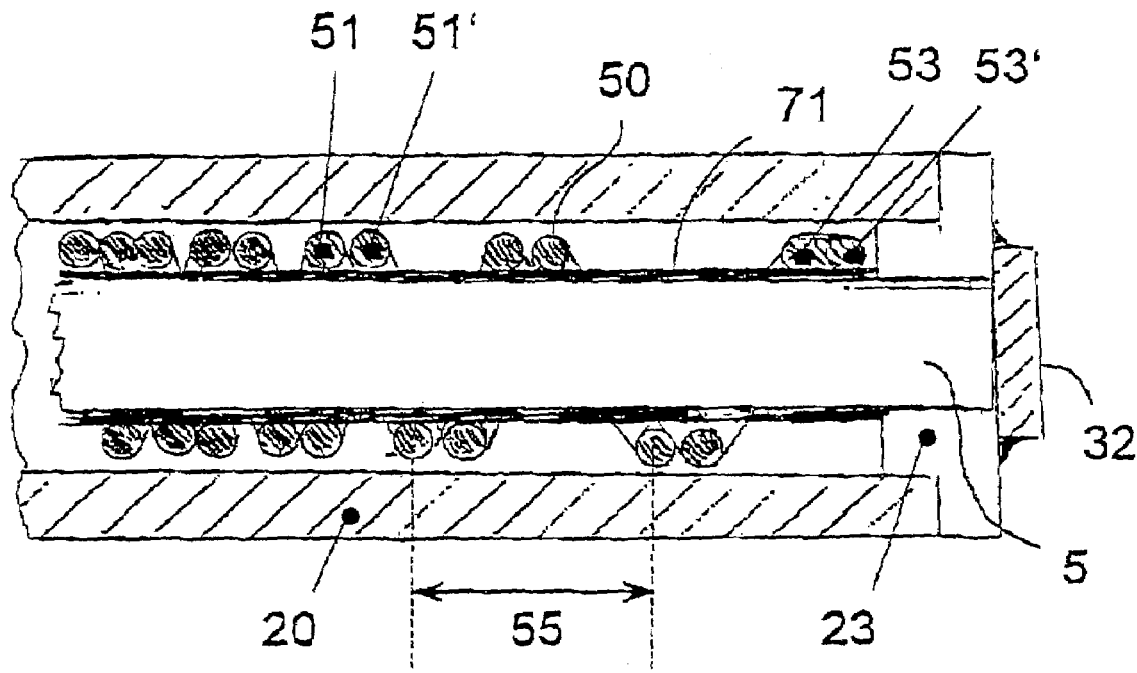
FIG. 8 A diagrammatic axial section through a fibre optic temperature measurement device having a temperature-dependent conductor in a coupling in area.
Figure 9:
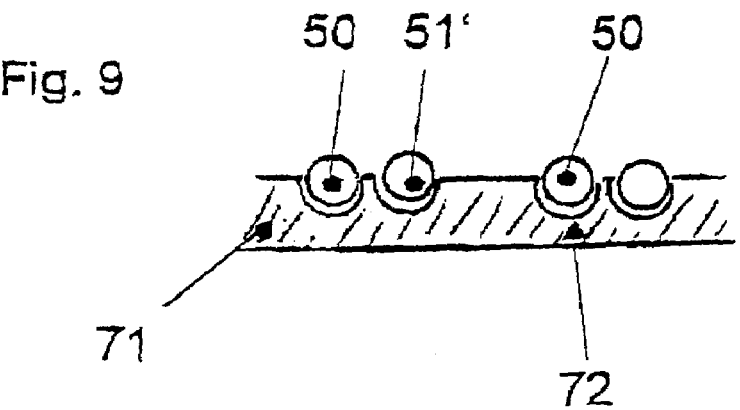
FIG. 9 A diagrammatic, larger-scale view of the sleeve of FIG. 8.

FIGS. 7 to 9 show another embodiment of a fibre optic temperature measurement device, which has a compensating device with a temperature-dependent conductor 50. Some of the components described in this embodiment have a fundamentally identical or similar construction to the embodiments described relative to FIGS. 1 to 4. These components are given the same reference numerals and will not be described again here.

In the interior of the protective tube 20, a temperature-dependent conductor 50 constructed as a wire is wound round the optical fibre 5. The winding is of a bifilar nature, so that in each case two windings 51, 51', corresponding to an outward line and a return line, are in each case arranged in immediately adjacent form. At the detector-side end of the protective tube 20, detector-side wire ends 52, 52' of the bifilar wound, temperature dependent conductor 50 are connected by means of first connecting lines 63 to a compensating amplifier 61. The first connecting line 63, provided with insulation, pass through the protective tube 20 in the immediate vicinity of the first ferrule 22. By means of second connecting lines 62 connected to connecting pins 14 the detector 10 is in electrical contact with a measuring amplifier 60. At the output of the measuring amplifier 60 is produced a measuring voltage, which can be offset against a compensating voltage produced at the output of the compensating amplifier 61 for compensating the thermal characteristic radiation of the optical fibre 5.

Wire ends 53, 53', spaced from the detector 10 and located close to the second ferrule 23, are electrically interconnected. The individual windings of the temperature-dependent conductor 50 have a mutual pitch 55, which decreases in the direction from the second ferrule 23 to the detector 10 corresponding to the damping of the optical fibre 5.

The optical fibre 5 is surrounded by a flexible sleeve 71 having grooves 72 for receiving the temperature-dependent conductor constructed as a wire.

What is claimed is:

1. Device for fibre optic temperature measurement with an optical fibre, which has a radiation coupling in area and a radiation coupling out area associated with a detector, wherein:
   said optical fibre is constructed with high transmission in the infrared (IR) spectral range,
   said optical fibre has a thermal characteristic radiation and a compensating device is provided for taking account of said thermal characteristic radiation of said optical fibre during temperature measurement,
   said compensating device has a temperature-dependent conductor,
   said temperature-dependent conductor is a wire,
   said wire is placed around said optical fibre accompanied by a formation of windings, and
   said optical fibre has a damping behaviour and said windings have varying pitches, which are adapted to said damping behaviour of said optical fibre.

2. Device according to claim 1, wherein said optical fibre is constructed with high transmission in the range from approximately 2 $\mu$m to approximately 20 $\mu$m.

3. Device according to claim 2, wherein said optical fibre is constructed with high transmission in the wavelength range 4 $\mu$m to 18 $\mu$m.

4. Device according to claim 2, wherein said optical fibre is a silver halide fibre.

5. Device according to claim 2, wherein said optical fibre is a fibre based on a solid AgCl:AgBr solution.

6. Device according to claim 1, wherein said detector is constructed as a thermopile.

7. Device according to claim 1, wherein said detector has a hermetically sealed casing and said hermetically sealed casing has a passage for said optical fibre.

8. Device according to claim 7, wherein said hermetically sealed casing is filled with an inert gas.

9. Device according to claim 7, wherein said hermetically sealed casing is evacuated.

10. Device according to claim 7, wherein in said passage for said optical fibre is provided a first ferrule in which is held said optical fibre.

11. Device according to claim 10, wherein said first ferrule provided in said passage of said hermetically sealed casing is fitted into a protective tube and said optical fibre in said radiation coupling in area is held in a second ferrule, which is fitted into said protective tube.

12. Device according to claim 7, wherein said optical fibre is surrounded by a protective device outside said hermetically sealed casing.

13. Device according to claim 12, wherein said protective device is a protective tube.

14. Device according to claim 1, wherein said radiation coupling out area has a coupling out point of said optical fibre and a distance between said coupling out point of said optical fibre and a sensitive coating of said detector is set in such a way that a radiation cone passing out of said optical fibre covers a surface formed by said sensitive coating of said detector.

15. Device according to claim 1, wherein, in said coupling in area, said optical fibre has an optical filter.

16. Device according to claim 15, wherein said optical filter is a band pass filter with a transmission range of 8 $\mu$m to 14 $\mu$m.

17. Device according to claim 15, wherein said optical filter is provided with an antireflection coating.

18. Device according to claim 15, wherein said optical filter is constructed as an optical element.

19. Device according to claim 18, wherein said optical element is a lens.

20. Device according to claim 1, wherein said wire is a nickel wire.

21. Device according to claim 1, wherein said wire is wound in a bifilar manner.

22. Device according to claim 1, wherein said optical fibre is surrounded by a sleeve.

23. Device according to claim 1, wherein said detector produces a measuring signal, said compensating device has means for producing a compensating signal and said compensating device has means for correcting said measuring signal of said detector with said compensating signal.

24. Device for fibre optic temperature measurement with an optical fibre, which has a radiation coupling in area and a radiation coupling out area associated with a detector, wherein:
   said optical fibre is constructed with high transmission in the infrared (IR) spectral range,
   said optical fibre has a thermal characteristic radiation and a compensating device is provided for taking account of said thermal characteristic radiation of said optical fibre during temperature measurement,
   said compensating device has a temperature-dependent conductor,
   said optical fibre is surrounded by a sleeve, and
   said sleeve has grooves for receiving said temperature-dependent conductor.

25. Device according to claim 24, wherein said optical fibre is constructed with high transmission in the range from approximately 2 $\mu$m to approximately 20 $\mu$m.

26. Device according to claim 25, wherein said optical fibre is constructed with high transmission in the wavelength range 4 $\mu$m to 18 $\mu$m.

27. Device according to claim 25, wherein said optical fibre is a silver halide fibre.

28. Device according to claim 25, wherein said optical fibre is a fibre based on a solid AgCl:AgBr solution.

29. Device according to claim 24, wherein said detector is constructed as a thermopile.

30. Device according to claim 24, wherein said detector has a hermetically sealed casing and said hermetically sealed casing has a passage for said optical fibre.

31. Device according to claim 30, wherein said hermetically sealed casing is filled with an inert gas.

32. Device according to claim 30, wherein said hermetically sealed casing is evacuated.

33. Device according to claim 30, wherein in said passage for said optical fibre is provided a first ferrule in which is held said optical fibre.

34. Device according to claim 33, wherein said first ferrule provided in said passage of said hermetically sealed casing is fitted into a protective tube and said optical fibre in said radiation coupling in area is held in a second ferrule, which is fitted into said protective tube.

35. Device according to claim 30, wherein said optical fibre is surrounded by a protective device outside said hermetically sealed casing.

36. Device according to claim 35, wherein said protective device is a protective tube.

37. Device according to claim 24, wherein said radiation coupling out area has a coupling out point of said optical fibre and a distance between said coupling out point of said optical fibre and a sensitive coating of said detector is set in such a way that a radiation cone passing out of said optical fibre covers a surface formed by said sensitive coating of said detector.

38. Device according to claim 24, wherein, in said coupling in area, said optical fibre has an optical filter.

39. Device according to claim 38, wherein said optical filter is a band pass filter with a transmission range of 8 μm to 14 μm.

40. Device according to claim 38, wherein said optical filter is provided with an antireflection coating.

41. Device according to claim 38, wherein said optical filter is constructed as an optical element.

42. Device according to claim 41, wherein said optical element is a lens.

43. Device according to claim 24, wherein said detector produces a measuring signal, said compensating device has means for producing a compensating signal and said compensating device has means for correcting said measuring signal of said detector with said compensating signal.

* * * * *